United States Patent
Chou et al.

[19]

[11] Patent Number: 6,055,504

[45] Date of Patent: Apr. 25, 2000

[54] METHOD AND SYSTEM FOR ACCOMMODATING ELECTRONIC COMMERCE IN A COMMUNICATION NETWORK CAPACITY MARKET

[75] Inventors: Yu-Li Chou; Amit Garg, both of White Plains, N.Y.

[73] Assignee: International Business Machines Corporation, Armonk, N.Y.

[21] Appl. No.: 08/988,721

[22] Filed: Dec. 11, 1997

[51] Int. Cl.[7] .................................................. G06F 17/60
[52] U.S. Cl. .................. 705/1; 705/37; 705/35; 705/400; 705/412; 705/26; 705/1; 705/21
[58] Field of Search ................ 705/37, 35, 400, 705/412, 26, 1, 21, 36; 235/380; 380/23

[56] References Cited

U.S. PATENT DOCUMENTS

| | | | |
|---|---|---|---|
| 3,573,747 | 4/1971 | Adams et al. | 705/37 |
| 4,903,201 | 2/1990 | Wagner | 705/37 |
| 5,557,518 | 9/1996 | Rosen | 705/69 |
| 5,727,165 | 3/1998 | Ordish et al. | 705/37 |
| 5,802,502 | 4/1994 | Gell et al. | 705/37 |
| 5,873,071 | 2/1999 | Ferstenberg et al. | 705/37 |
| 5,924,083 | 5/1996 | Silverman et al. | 705/37 |

OTHER PUBLICATIONS

Ravi et al, Electronic Commerce, PP 6, 13, 33, 38, 39, 41, 43, 49, 50, 51, 55, 119–120, 176, 178, 179, 214, 366–367, 377, 380, Dec. 1996.

Donal O'Mahony, Electronic Payment systems, PP 176–177, May 1997.

*Primary Examiner*—James P. Trammell
*Assistant Examiner*—Mussie Tesfamariam
*Attorney, Agent, or Firm*—McGinn & Gibb, P.C.; Stephen C. Kaufman

[57] ABSTRACT

A method for accommodating electronic commerce in a communication network capacity market. The method includes the steps of identifying a plurality of players in the communication network capacity market, each of which players can solicit capacity in communication network capacity market; providing a neutral third-party, the neutral third party and the plurality of players configured in a hub arrangement for communicating with each of the plurality of players in communication network capacity trades; and, realizing an open market conditionality between each of the plurality of players and the neutral third party so that the communication network capacity supplied by one or more of the players can be bought and sold among the players; and, the neutral third party can preserve anonymity of each of the plurality of players soliciting communication network capacity.

26 Claims, 2 Drawing Sheets

METHOD AND SYSTEM FOR ACCOMMODATING ELECTRONIC COMMERCE IN A COMMUNICATION NETWORK CAPACITY MARKET

BACKGROUND OF THE INVENTION

This invention relates to a method and system for accommodating electronic commerce in a communication network capacity market.

INTRODUCTION TO THE INVENTION

Telecom deregulation, among other factors, has increased competition and has impelled companies in this industry to offer products and services in regions that were previously served by only one carrier. As a result, companies need to forecast traffic and hence capacity they need, in different parts of their network. Often times, there is a mismatch of capacity available with respect to traffic through the network. Therefore, companies need to obtain additional capacity or have excess capacity. Currently, under such conditions, companies often negotiate directly with their competitors to buy and sell capacity.

SUMMARY OF THE INVENTION

We have discerned that an important drawback of direct negotiations to buy or sell capacity is the information companies need to inadvertently share or provide to their competitors. Each negotiation (or even interest) to buy or sell capacity gives competitors information about a companies expectation of traffic in a given segment of the network, which can be used to distort prices. In sharp contrast, a novel electronic marketplace, which we disclose herein, can enable companies to trade capacity anonymously, without worrying about revealing too much information to their competitors. This anonymity also facilitates more efficient pricing and allocation of communication network capacity.

Another trend that can make the present invention a more attractive alternative to current practices, is driven by technological advances in computer and communication industries.

Convergence of technologies from different segments of communications industry has enabled companies to transmit digital information comprising voice, video, data, cable TV broadcasts, etc., over the same network. Increased usage of computer is resulting in an exponential growth in data traffic in the network. There is an overarching need to increase capacity utilization in communication networks.

In addition to increased traffic volumes from traditional sources such as the telephone carriers, data traffic in the network today is due to new entrants such as Internet Service Providers (ISPs), cable companies, etc. Therefore, the number of players in the communications market has increased (or will increase) manifold. Under this scenario, direct negotiations with competitors for best bargains in telecom capacity may result in high search costs. These search costs manifest themselves as the time and expense of obtaining the best price. Under the new methodology of the present invention, players' search costs can be significantly lower, because it can eliminate the need to establish one-to-one contact for buying and selling telecom capacity.

In a first aspect, the present invention comprises a computer-implemented method for accommodating electronic commerce in a communication network capacity market, the method comprising the steps of:

1) identifying a plurality of players in the communication network capacity market, each of which players can solicit capacity in communication network capacity market;

2) providing a neutral third-party, the neutral third party and the plurality of players configured in a hub arrangement for communicating with each of the plurality of players in communication network capacity trades; and 3) realizing an open market conditionality between each of the plurality of players and the neutral third party so that:
   I) the communication network capacity supplied by one or more of the players can be bought and sold among the players; and,
   ii) the neutral third party can preserve anonymity of each of the plurality of players soliciting communication network capacity.

In a second aspect, the present invention comprises a system for accommodating electronic commerce in a communication network capacity market, the system comprising:

1) means for identifying a plurality of players in the communication network market, each of which players can solicit capacity in the communication network market;

2) means for providing a neutral third-party, the neutral third party and the plurality of players configured in a hub arrangement for communicating with each of the plurality of players in communication network capacity trades; and 3) means for effecting an open market conditionality between each of the plurality of players and the neutral third part so that:
   I) the communication network capacity supplied by one or more of the players can be bought and sold among the players; and,
   ii) the neutral third party can preserve anonymity of each of the plurality of players soliciting communication network capacity.

BRIEF DESCRIPTION OF THE DRAWING

The invention is illustrated in the accompanying drawing, in which.

DETAILED DESCRIPTION OF THE INVENTION

Elements of the Invention

In order for this market to work effectively, we need to elaborate on its essential elements. The main elements of this market comprise:

Commodity;
Players;
Operational Conditions.

Commodity

Commodity being traded in the system is capacity in communication networks. Capacity has several attributes defining it, including:

Bandwidth;

End-points of the network;

Time interval;

Type of communication network which includes wireline, cable, Internet, satellite, PCS, etc.

Players

As mentioned earlier, because of technological developments in computer and communications industries, a plurality of players now utilize capacity over the communications networks. These players may include:

Phone carriers;

Internet service providers (ISPs);

Cable Companies;

Bulk buyer/sellers of communications capacity including consolidators and large corporations.

Figure 1:
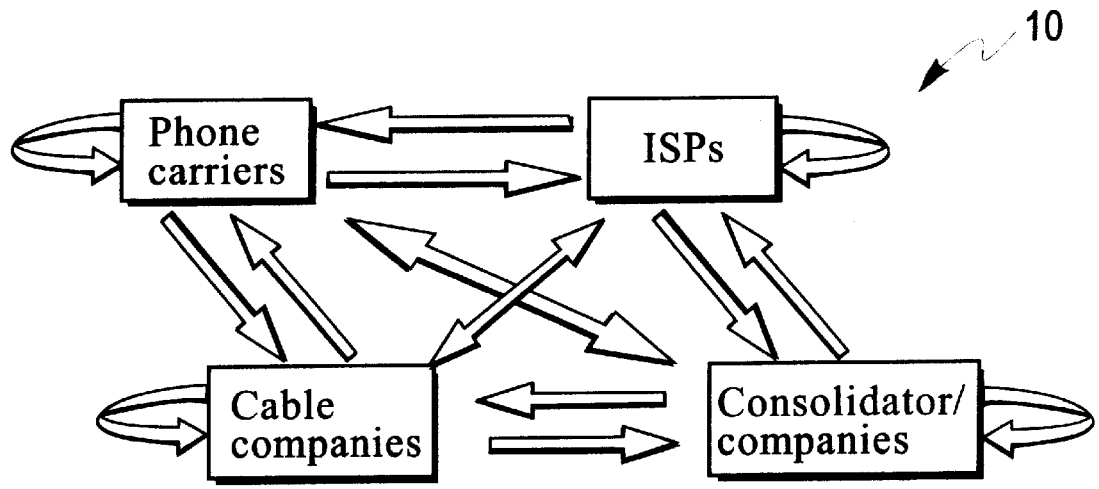
FIG. 1 illustrates relationships among players without an exchange market.
Figure 2:
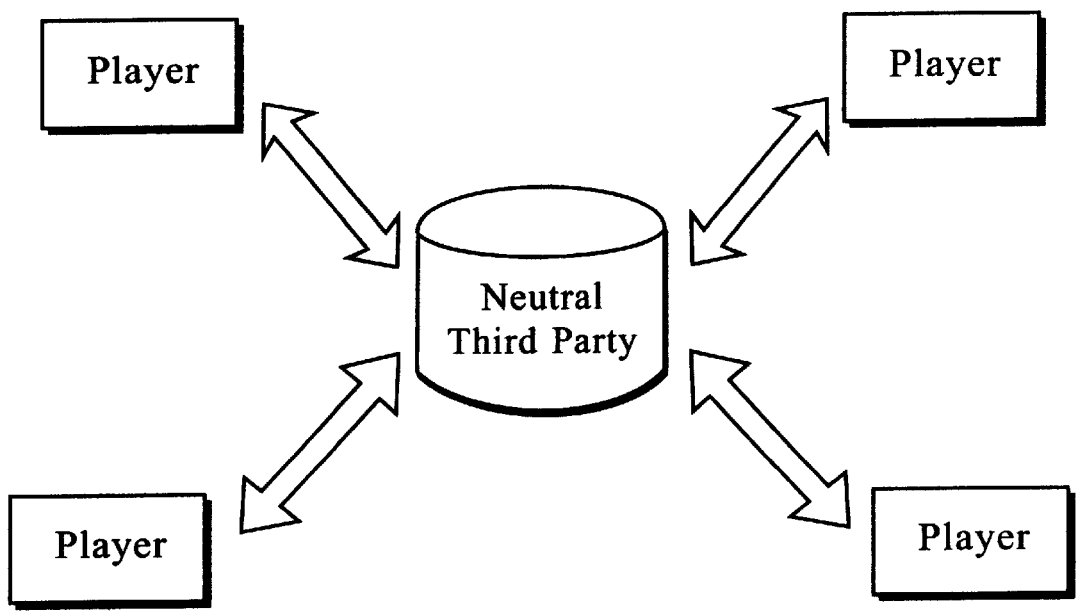
FIG. 2 illustrates players buying and selling capacity, anonymously, in accordance with the present invention.

FIG. 1, numeral 10, depicts the current relationship among these players. In this figure ⱭA→BⰬ represents B purchases communication capacity from A. In sharp contrast, FIG. 2, numeral 12, shows the market dynamics when trading can be done through a system in accordance with the present invention.

Operational Conditions of the Invention

Figure 3:
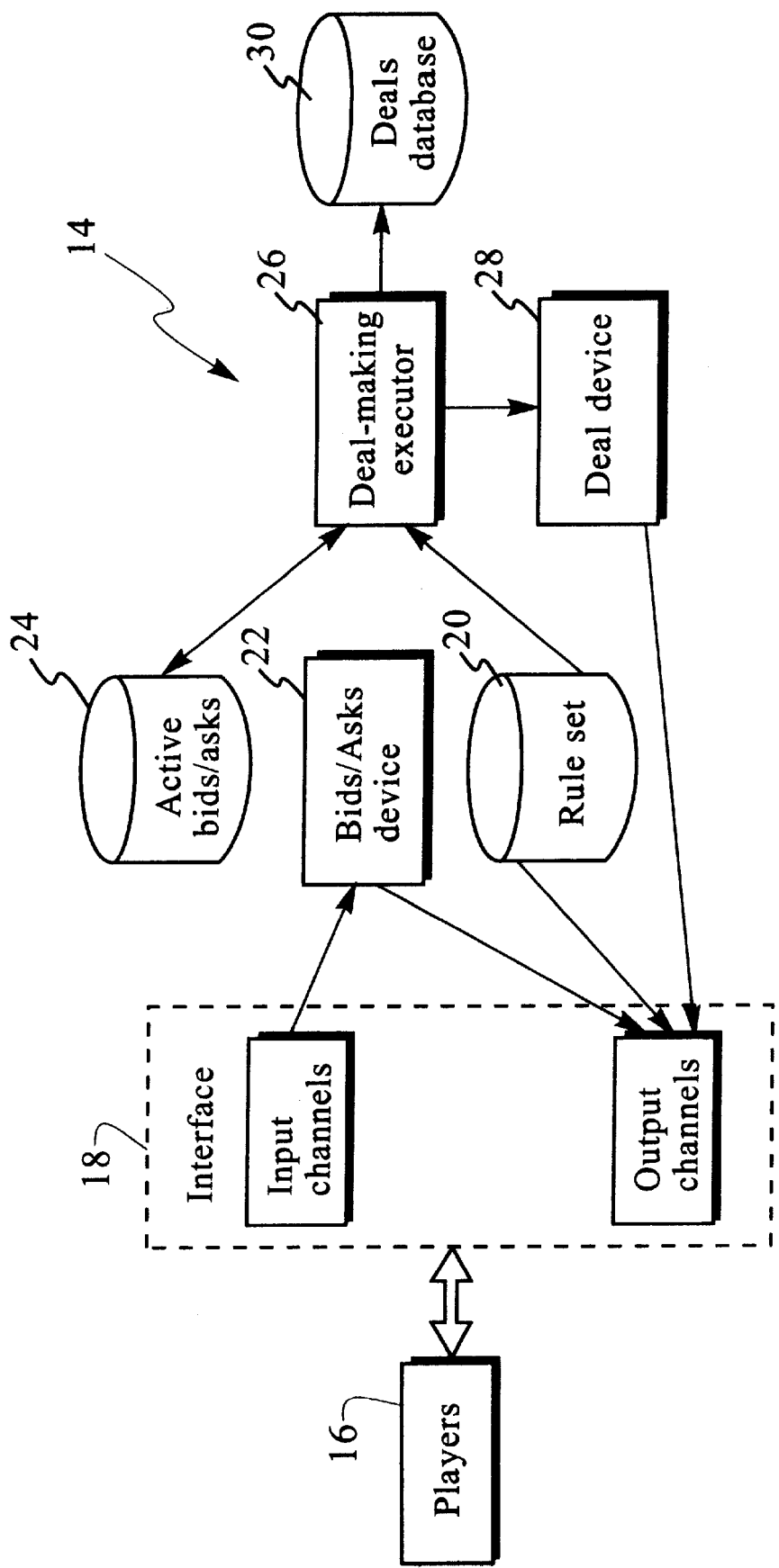
FIG. 3 shows an operational architecture of a system of the present invention.

FIG. 3 depicts a preferred operational architecture of a system 14 where players 16 can interact through an interface 18 comprising input and output channels. This operational architecture includes the following components;

Interface: an interface 18 comprises input and output channels.

Input Channels: the input channels enable players to submit to the system their offers (asks) and/or requests (bids) for desired quantity of a commodity, their identities, and whether or not they want their identities revealed. These channels include, for example, Internet, telephone, EDI, and e-mail. The possible set of input channels should be clearly identified in the market rules.

Output channels: Output channels include the means of confirming to the execution of trades placed by the players. These output channels could be Internet, e-mails, phone calls, etc. Players who are party to the executed deals can receive detailed information to relevant terms (e.g., prices and allocated commodity). The complete set of possible output channels should be clearly stated in the market rules.

Set of rules 20: the rules include security-related issues, legal requirements for all potential players (e.g., payments and deal execution requirements, etc.), a deal-making mechanism (e.g., an auction mechanism), and methods and requirements for submitting offers/requests. The rules should be clearly stated to all players and strictly followed. (Note that more than one type of deal-making mechanism is possible. However, different mechanisms may result in different market efficiencies —capacity utilization and commodity valuation.)

Bids/Asks device 22: The bids/asks device validates bids and/or asks submitted by players through input channels. If a bid or an ask is invalid, the device informs relevant players through the output channels. Otherwise, the device stores the bid or ask in the active bids/asks database. The device can provide players with information specified within the set of rules through the output channels. For example, this information can include the price at which the last deal for that commodity was executed.

Active bids/asks database 24: This database preferably maintains a list of valid unexecuted bids and asks for each commodity.

Deal-making executor 26: The deal-making executor takes all the valid (unexecuted) bids and asks submitted by players and finds feasible matched deals according to the procedures stated in the rule set. Outcomes are a set of contracts, which include commodity allocations and prices.

Deal device 28: The device receives information on deals executed from the deal-making executor. This device informs buyers and sellers if their bids and asks respectively were executed. If a buyer or a seller wishes to remain anonymous, the device will not make their identities known to the public.

Deals database 30: The deals database preferably maintains a record of all trades executed by the deal-making executor.

What is claimed:

1. A computer implemented method for accommodating electronic commerce in a communication network capacity market, the method comprising:

1) identifying a plurality of players in the communication network capacity market, each of which players can solicit capacity in said communication network capacity market;

2) providing a neutral third-party, the neutral third-party and the plurality of players configured in a hub arrangement such that said neutral third-party is provided in a center of the hub arrangement for communicating with each of the plurality of players; and 3) realizing an open market conditionality between each of the plurality of players and the neutral third-party so that:

i) by utilizing the neutral third-party, the communication network capacity supplied by one or more of the players can be bought and sold among the players; and ii) the neutral third-party can preserve anonymity of each of the plurality of players soliciting communication network capacity.

2. A method according to claim 1, wherein said plurality of players is selected from the group consisting of phone companies, Internet service providers, consolidators, and cable companies.

3. A method according to claim 1, wherein soliciting comprises ascertaining a market price of the communication network capacity.

4. A method according to claim 1, wherein soliciting comprises specifying the availability of the communication network capacity.

5. A method according to claim 1, wherein communication network capacity comprises specifying attributes of said communication network capacity.

6. A method according to claim 1, wherein preserving anonymity by the neutral third party comprises the neutral third party not revealing a player's identity to anyone.

7. A method according to claim 4, wherein specifying available communication network capacity comprises connoting a price at which any of said plurality of players is willing to buy.

8. A method according to claim 4, wherein specifying available communication network capacity comprises connoting a price at which a player from among a plurality of players is willing to sell it.

9. A system for accommodating electronic commerce in a communication network capacity market, the system comprising:

1) means for identifying a plurality of players in the communication network market, each of which players can solicit capacity in the communication network market;

2) means for providing a neutral third-party, the neutral third-party and the plurality of players configured in a hub arrangement such that said neutral third-party is provided in a center of the hub arrangement for communicating with each of the plurality of players; and 3) means for effecting an open market conditionality between each of the plurality of players and the neutral third-party so that:

i) by utilizing the neutral third-party, the communication network capacity supplied by one or more of the players can be bought and sold among the players; and ii) the neutral third-party can preserve anonymity of each of the plurality of players soliciting communication network capacity.

10. A system according to claim 9, wherein the means for providing the neutral third-party comprises:

1) a set of input channels for effecting an interface between the players and the neutral third-party;

2) a rules device for coordinating trades among the players through the neutral third-party using a set of rules;

3) a bids/asks device for receiving information from the input channels, validating and storing information;

4) an active bids/asks database for storing information including a set of valid active bids and asks for each commodity;

5) an executor receiving inputs from the rules device, retrieving inputs from and updating the active bids/asks database, and having a capability to execute a trade;

6) a deal device receiving inputs from the executor and outputting results of trades to the players via an output channel;

7) a deals database receiving and storing inputs from the executor; and 8) a set of output channels for effecting an interface between the players and the neutral third-party.

11. A system according to claim 10, wherein the input channel comprises an Internet.

12. A system according to claim 10, wherein the input channel comprises a telephone.

13. A system according to claim 10, wherein the input channel comprises electronic mail.

14. A system according to claim 10, wherein the rules device comprises means for establishing conditions for effecting trades.

15. A system according to claim 14, wherein the conditions comprises at least one of legal requirements, financial requirements, security requirements, deal-making mechanism, and mechanism submitting bid and ask orders.

16. A system according to claim 10, wherein the bids/asks device comprises means for collecting unexecuted buy and sell orders for capacity in communication networks, validating buy and sell orders according to the set of rules, storing valid orders in said active bids/asks database, and outputting information to players through a set of output channels.

17. A system according to claim 10, wherein the active bids/asks database comprises means for storing valid unexecuted buy and sell orders.

18. A system according to claim 10, wherein the executor comprises means for executing a trade by interpreting rules from the rules device to match unexecuted buy and sell orders stored in the active bids/asks database and means for updating the active bids/asks database and said deals database.

19. A system according to claim 18, wherein the trade is an outcome from the executor and comprises price, allocation of the communication network capacity, and the players involved.

20. A system according to claim 10, wherein the deal device comprises means for collecting the trades executed by the executor and outputting relevant information to the players through the output channel.

21. A system according to claim 20, wherein relevant trade information comprises means for confirming to the player if their buy order was executed, the price at which communication network capacity was bought, and the quantity purchased.

22. A system according to claim 20, wherein relevant trade information comprises means for confirming to the player if their sell order was executed, the price at which communication network capacity was sold, and the quantity sold.

23. A system according to claim 10, wherein the deals database comprises means for storing executed trades.

24. A system according to claim 10, wherein the output channel comprises an internet.

25. A system according to claim 10, wherein the output channel comprises a telephone.

26. A system according to claim 10, wherein the output channel comprises an electronic data interchange (EDI).

* * * * *